US012710255B1

(12) United States Patent
Coffee et al.

(10) Patent No.: US 12,710,255 B1
(45) Date of Patent: Aug. 18, 2026

(54) LINEAR SHAPED CHARGE ELECTRO-EXPLOSIVE (LSCe) DEVICE WITH A BACKSIDE BOOSTED INITIATION

(71) Applicant: Raytheon Company, Arlington, VA (US)

(72) Inventors: Shawn S. Coffee, Tucson, AZ (US); Christopher F. Williams, Tucson, AZ (US); Louis A. Digilio, Northborough, MA (US); John Rascon, Tucson, AZ (US); Mark W. Olles, Hilton, NY (US); Ian D. Stochl, Bloomfield, NY (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 19/057,581

(22) Filed: Feb. 19, 2025

(51) Int. Cl.
*F42B 1/028* (2006.01)
*B33Y 80/00* (2015.01)
*F42B 3/195* (2006.01)

(52) U.S. Cl.
CPC .............. *F42B 1/028* (2013.01); *B33Y 80/00* (2014.12); *F42B 3/195* (2013.01)

(58) Field of Classification Search
CPC .. F42B 1/02; F42B 1/024; F42B 1/028; F42B 3/08
See application file for complete search history.

(56) References Cited

U.S. PATENT DOCUMENTS 3,100,445 A * 8/1963 Poulter ................. C06B 23/001 102/701
3,176,613 A * 4/1965 Godfrey .................. F42B 1/028 102/306

(Continued)

FOREIGN PATENT DOCUMENTS

CA 2497099 5/2015
DE 10251676 A1 * 5/2004 ............ F42B 12/204

(Continued)

OTHER PUBLICATIONS

"Explosive Assembly With a Linear Shaped Charge End Cap", Purdue Innovates Office of Technology Commercialization, (2024), 2 pgs.

(Continued)

*Primary Examiner* — Gabriel J. Klein
(74) *Attorney, Agent, or Firm* — Schwegman Lundberg & Woessner, P.A.

(57) ABSTRACT

A linear shaped charge electro-explosive (LSCe) device integrates an initiator and booster charge on the backside of a main charge and solid V-shaped liner. The initiator is responsive to an electric stimulus to produce a shockwave that detonates and propagates through the booster charge to magnify the shockwave, which in turn detonates and propagates the main charge to further magnify the shockwave that collapses the solid V-shaped liner and projects forward a shaped charge jet. A wave shaper may be positioned in the booster or main charge to flatten the wave front into an approximately planar wave front when the magnified shockwave interacts with the V-shaped liner. The wave shaper and main charge and possibly all components energetic and non-energetic, except the initiator, may be formed using additive manufacturing. Alternately, only non-energetic components may be formed using additive manufacturing. The device may be formed into a linear, are or ring-shaped form factor. Additive manufacturing enables device scaling and optimal device function resulting in enhanced shaped jet output beyond those of traditional LSCs.

19 Claims, 14 Drawing Sheets

(56) References Cited

U.S. PATENT DOCUMENTS 3,404,600 A * 10/1968 Bilek ...................... F42B 1/024 102/306
3,561,361 A * 2/1971 Kessenich ............... F42C 19/09 102/307
3,934,511 A * 1/1976 Cordle .................... F42B 12/14 102/307
4,291,624 A * 9/1981 Sabranski ............... F42B 1/024 102/306
4,430,939 A 2/1984 Harrold
4,643,097 A * 2/1987 Chawla ..................... F42B 1/02 102/306
5,565,644 A 10/1996 Chawla
6,026,750 A 2/2000 Nelson
6,983,698 B1 * 1/2006 Walters ..................... F42B 1/02 102/305
7,752,972 B1 * 7/2010 Baker ..................... F42B 1/024 102/476
9,534,874 B2 * 1/2017 Alford .................... F42B 1/028
9,702,668 B2 7/2017 Peterson et al.
9,778,008 B2 10/2017 Scheid et al.
10,054,414 B2 8/2018 Scheid et al.
10,670,381 B1 6/2020 Anderson et al.
10,739,112 B1 * 8/2020 Renn ......................... B64C 1/32
10,844,696 B2 11/2020 Eitschberger et al.
2005/0115391 A1 * 6/2005 Baker ....................... F42B 1/02 89/1.151
2005/0126420 A1 * 6/2005 Givens ...................... F42D 3/00 102/310
2006/0201373 A1 * 9/2006 Sammons ................. C06C 5/04 102/476
2010/0018427 A1 * 1/2010 Roland ................... F42B 1/024 102/305
2014/0291022 A1 * 10/2014 Yang ..................... E21B 43/117 175/2
2015/0323294 A1 * 11/2015 Scheid ...................... F42B 1/02 102/307
2016/0169639 A1 * 6/2016 Smart ..................... F42B 1/032 102/306
2017/0241754 A1 * 8/2017 Gash ......................... F42B 1/02
2018/0252507 A1 * 9/2018 Collier .................. E21B 43/117
2019/0072368 A1 * 3/2019 Lumley ..................... F42B 3/08
2020/0158479 A1 * 5/2020 Boulanger .............. F42B 1/028
2020/0191535 A1 * 6/2020 Murray ................... F42B 3/093
2021/0180922 A1 * 6/2021 Lumley ..................... F42B 1/02
2021/0223006 A1 * 7/2021 Metzger ................ E21B 43/119
2021/0310773 A1 * 10/2021 Johnson .................... F42B 3/08
2024/0167797 A1 * 5/2024 Cohen .................... B33Y 30/00

FOREIGN PATENT DOCUMENTS

DE 102017012107 B3 * 4/2019 ................ F42B 1/02
WO 2011086364 7/2011

OTHER PUBLICATIONS

"Linear Shaped Charge", Ensign Bickford Aerospace and Defense, (Jun. 7, 2024), 3 pgs.

Xue, Hao, "Perspectives on Additive Manufacturing for Warhead Applications", Science Direct Defence Technology, (Feb. 27, 2024), 27 pgs.

* cited by examiner

LINEAR SHAPED CHARGE ELECTRO-EXPLOSIVE (LSCe) DEVICE WITH A BACKSIDE BOOSTED INITIATION

BACKGROUND

Field

This disclosure relates to Linear Shaped Charges (LSCs).

Description of the Related Art

Shape-forming charges are explosive charges shaped to focus the effect of the explosive's energy into a lens and are purely kinetic in nature. A shape-forming charge is composed of two major components: an explosive charge and a solid liner on a forward surface of the explosive charge. The liner is typically metal but may be a ceramic, glass or even polymer material. Shape-forming charges may be used to penetrate armor, punch holes in naval vessels such as surface ships or submarines or to perforate wells in the oil and gas industry, or to render safe unexploded ordinance (UXO) or improvised explosive device (IED) in explosive ordinance disposal.

One type of shape-forming charge is referred to as a shaped charge. In a unitary shaped charge, the shaped charge liner has an "apex angle" of 40°-120° about an axis of the warhead (e.g., a conical shaped liner along the axis of the warhead). Upon detonation, the liner material collapses via shockwave focusing toward the centerline and is projected forward as both a slug and a metal jet. The slug makes up approximately 75% of the liner mass and has minimal penetration. The metal jet tip travels much faster than the slug (at least 2×) and thus has much greater penetration capabilities than the slug.

A central initiator, array of initiator or initiation waveguide shape the detonation wave(s) into a plane wave that strikes the liner to form the slug and metal jet. The enormous pressure at the front of the plane wave generated by the detonation of the explosive drives the liner in the hollow cavity inward to collapse upon its central axis to project a high-velocity jet of metal particles forward along the axis.

Linear Shaped Charges are an explosive product that produces a linear cutting jet to sever a wide range of materials and applications such as cutting launch vehicle and missile skins for stage separation, rocket motor thrust termination, aircraft egress, beaching, Explosive Ordinance Disposal (EOD), and other applications where fast and reliable cutting is required. A LSC is a continuous explosive core enclosed in a seamless metal sheath shaped in the form of an inverted V. Typical sheath (or liner) materials include copper, lead, tin alloy and aluminum. Commonly used explosive materials include RDX, HNS, and HMX based polymer bonded explosives. Structural charge holders and mounts can be manufactured from a variety of materials such as structural foams, rigid plastics, or metal, depending on system integration, debris mitigation, and environmental systems. See Linear Shaped Charge (LSC)—Ensign-Bickford Aerospace & Defense, 2024.

An electro-explosive initiator or detonator is responsive to an electrical stimulus to detonate a small explosive pellet, which in turn detonates the main charge to collapse the liner and form the linear cutting jet. A common initiator is called an Exploding Foil Initiator (EFI) (See U.S. Pat. No. 4,788,913), which converts electrical energy into mechanical energy in the form of an accelerating mass or "flyer plate" that impacts and detonates the small explosive pellet. More specifically a high-voltage electrical stimulus creates a plasma from a foil, which drives another thin plastic or metal foil to create the mass or "flyer plate." The EFI includes the circuit, a gap such as provided by a barrel with a through hole or spacer through which the "flyer plate" is accelerated into the pellet.

Referring now to FIG. 1, a typical LSC firing train 100, which is duplicated for initiation redundancy includes a Safe & Arm Device (SAD) 102 that generates an electric stimulus when one or more conditions are satisfied (e.g., platform disconnect, acceleration level satisfied, separation time met, etc.) The SAD may, for example, generate a particular high-voltage charge potential (e.g., 1200 V). An initiator 106 such as an EFI, Low Energy EFI (LEEFI), an exploding bridgewire initiator (EBW) or hotwire initiator converts the electric stimulus to an explosive output 108 (e.g., a primary detonation wave). The EFI and LEEFI convert the electric stimulus to mechanical energy such as an accelerated mass or "flyer plate" that detonates an explosive charge (or "pellet") to produce the detonation wave, all within the EFI/LEEFI package. The explosive device output is coupled to an end tip 110 of a detonation cord 112 as an explosive device input 114. Detonation cord 112 transfers the detonation wave from Point A to Point B at another end tip 116 as an explosive device input 118, which detonates end tip 116 to produce another detonation wave that is coupled to an end of an LSC 120, which in turn detonates the LSC's main or secondary charge 122 to produce a linear shaped charge jet.

Commercial off-the-shelf (COTS) LSCs are manufactured on a large scale using standard machining processes. Metal tubing is filled with energetics and then extruded or pressed into the LSC V-shape. During the extrusion process the liner thickness becomes inconsistent due to the tubing (liner) being physically bent. The LSC may be bent into an arc to match the curvature required in the final application. Device processing often leads to faulty devices with cracks or delamination. Initiation for either or both ends limits the maximum cutting due to "run up" (a portion of the jet that is not at full length or velocity) or incomplete energetics detonation leading to loss of shaped jet formation. A secondary effect is "run down" or the shockwave propagation is incomplete resulting in a similar incomplete energetics detonation or loss of shaped jet formation.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a linear shaped charge electro-explosive (LSCe) device in which an initiator and booster charge are integrated on the backside of the LSC. The initiator is responsive to an electric stimulus to produce a shockwave that detonates and propagates through the booster charge to magnify the shockwave, which in turn detonates and propagates through the main charge to further magnify the shockwave that collapses the V-shaped liner into a lens and projects forward a linear shaped charge jet.

In an embodiment, a wave shaper is embedded in the main charge or booster charge opposite and spaced apart from the apex of the V-shaped channel. The wave shaper flattens the wave front of the magnified shockwave to optimize performance. More specifically, the wave shaper shapes the spherical wave front of the magnified shockwave to approximate a planar wave front that impacts and collapses the V-shaped liner. The wave shaper and booster charge reduce or completely eliminate run-up and run-down. The wave shaper may be parallel to the axis and extends at least the length of an interface between the booster and main charge. The wave shaper may be perpendicular to the axis having a length equal to the width of the main charge.

In different embodiments, the housing is formed of a high-density material that provides both packaging and tamping to focus the magnified shockwave onto the V-shaped liner. In an alternate embodiment, the housing is formed of a low-density material such as a plastic or lightweight metal that is not suitable for tamping. A high-density tamping liner (e.g., a metal) is positioned in the housing to surround the main and booster charges to focus the shockwave onto the V-shaped liner.

In different embodiments, energetics (e.g., the booster and main charge) and non-energetics (V-shaped layer, wave front shaper, high-density tamping liner and the housing) are created via additive manufacturing. In some cases, only the non-energetic components are created via additive manufacturing. In another case, only the main charge and the wavefront shaper embedded therein are created using additive manufacturing. Alternately, every energetic and non-energetic component except the initiator is created using additive concurrent or sequential multi-material deposition methods.

Additive manufacturing is a consistent, repeatable deposition process that greatly improves the uniformity of the solid V-shaped liner as well as other components that can be achieved in both linear and circular forming factors (e.g., arcs or rings). The LSCe device can scale in energetics leading to adjustable output without limitation on the amount of curvature or linear device length. Additive manufacturing enables embedding a wave shaper into the main charge.

In different embodiments, the initiator is one of an EFI, a LEEFI, an EBW Initiator, or a hotwire initiator. The initiator may be partially or fully embedded in the booster charge or may be adjoining the booster charge.

In an embodiment, a single initiator and booster charge are centrally located along the LSC to minimize run-up and run-down. In other embodiments, multiple initiators/booster charges are spaced along the LSC.

In different embodiments, the liner may be one of a V-shape in which the opposing surfaces are flat or have a trumpet shape in which the opposing surfaces extend forward from an apex and curve outward from an axis or a K-shape in which the opposing surfaces extend forward from an apex and curve inward towards an axis.

In different embodiments, N LSCe devices, where N is an integer of two or more, may be arranged end-to-end or tip-to-tail to extend the linear shaped charge jet. In one configuration, each LSCe device includes the booster and initiator and is independently initiated. In another configuration, one or more LSCe devices include the booster and initiator and are operatively coupled to initiate other LSC devices.

In different embodiments, additional booster charges and initiators may be spaced along the length of the LSC and operatively coupled to the main charge to facilitate longer LSCs.

In different embodiments, the booster charge and main charge may use interchangeable high explosives including but not limited to C4, PBXN-5, PBXN-110, HMX, RDX, PETN, HNS. The high explosives are composed so that the booster charge has a lower detonation threshold (is more sensitive) than the main charge.

These and other features and advantages of the disclosure will be apparent to those skilled in the art from the following detailed description of preferred embodiments, taken together with the accompanying drawings, in which:

DETAILED DESCRIPTION

Figure 1:
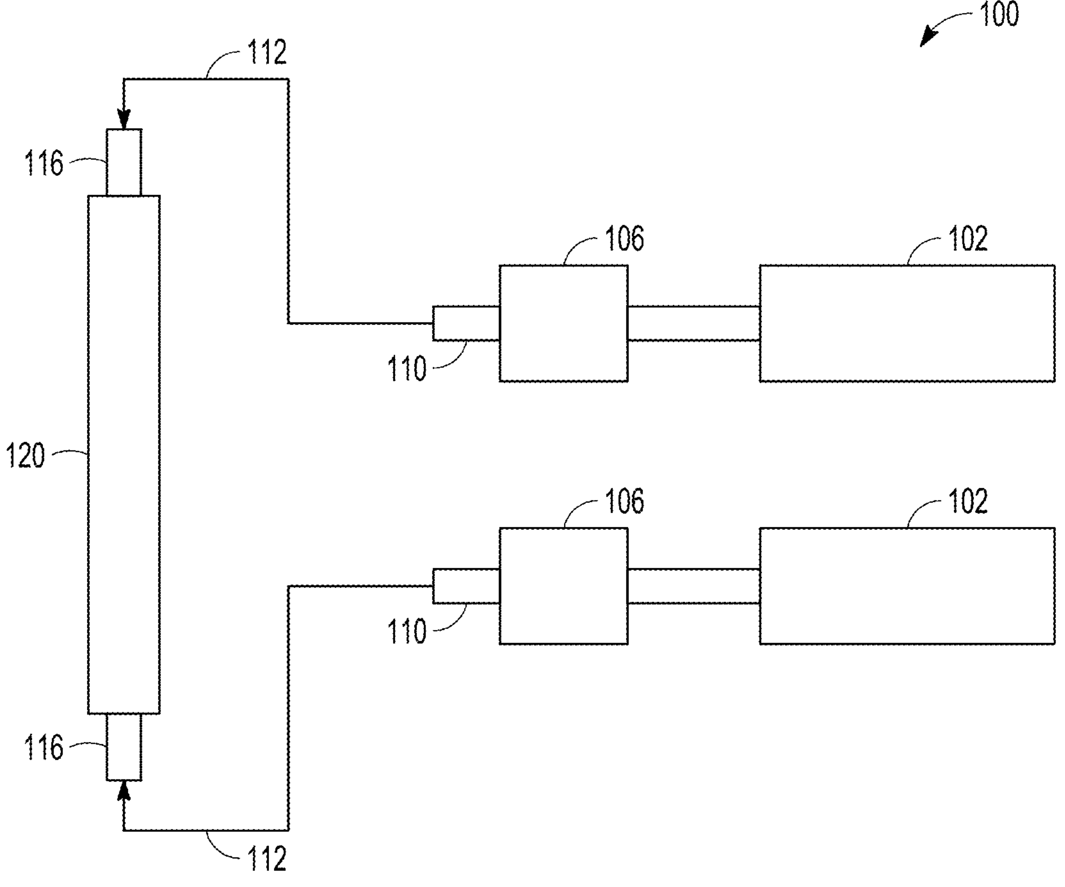
FIG. 1 illustrates a typical LSC firing train.
Figure 2A:
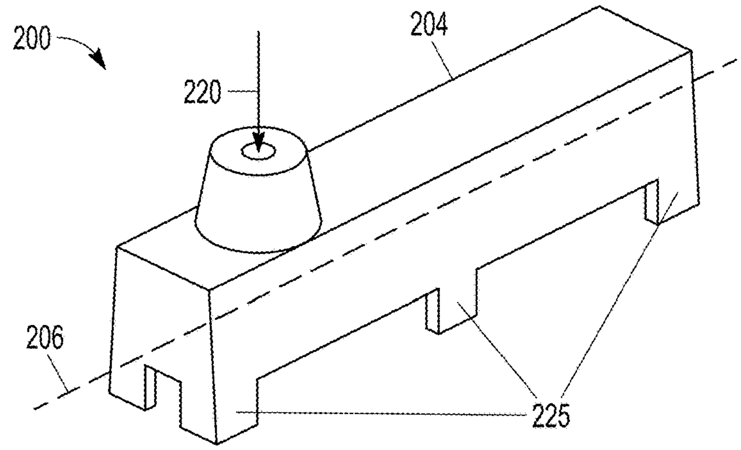
FIGS. 2A-2E illustrate different views of an embodiment of a LSCe.
Figure 2B:
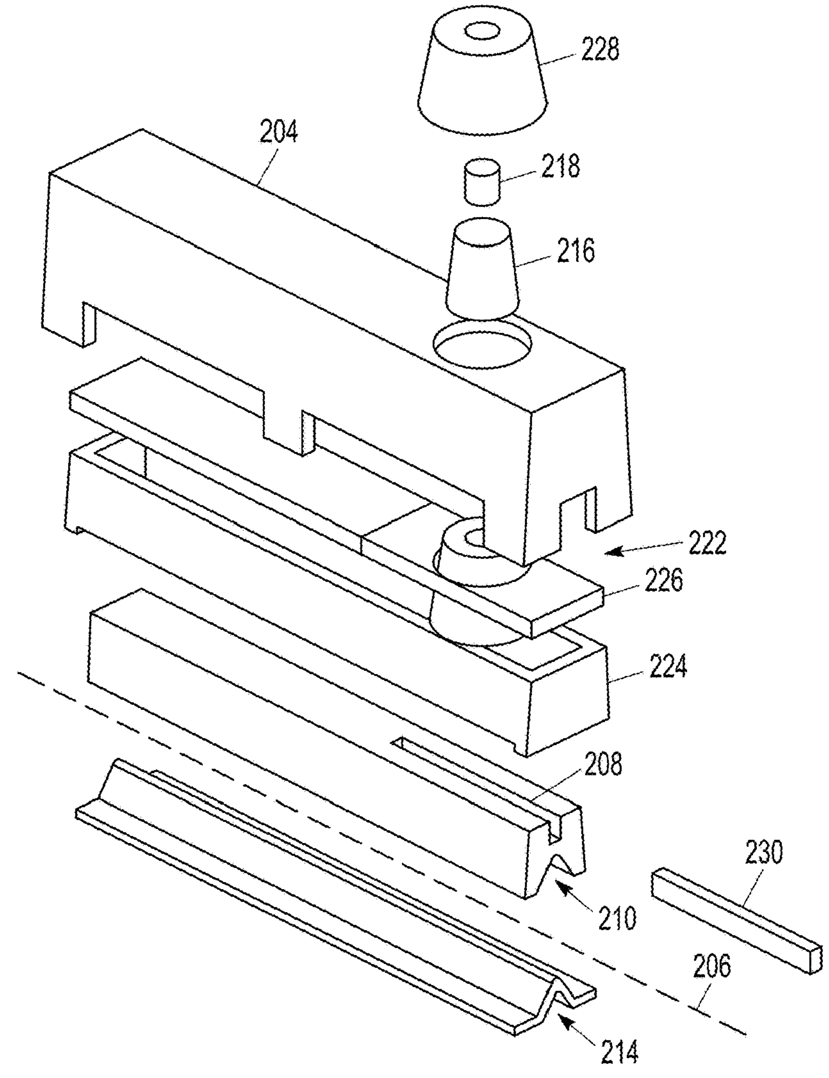
Figure 2C:
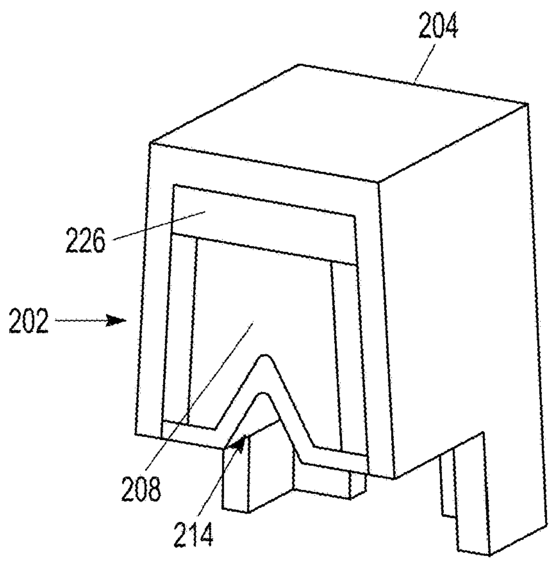
Figure 2D:
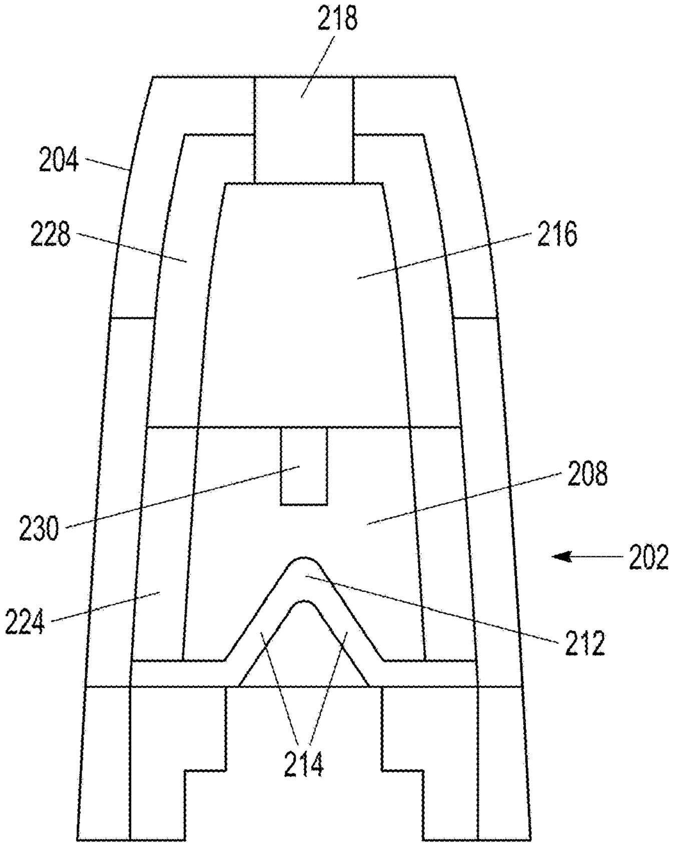
Figure 2E:
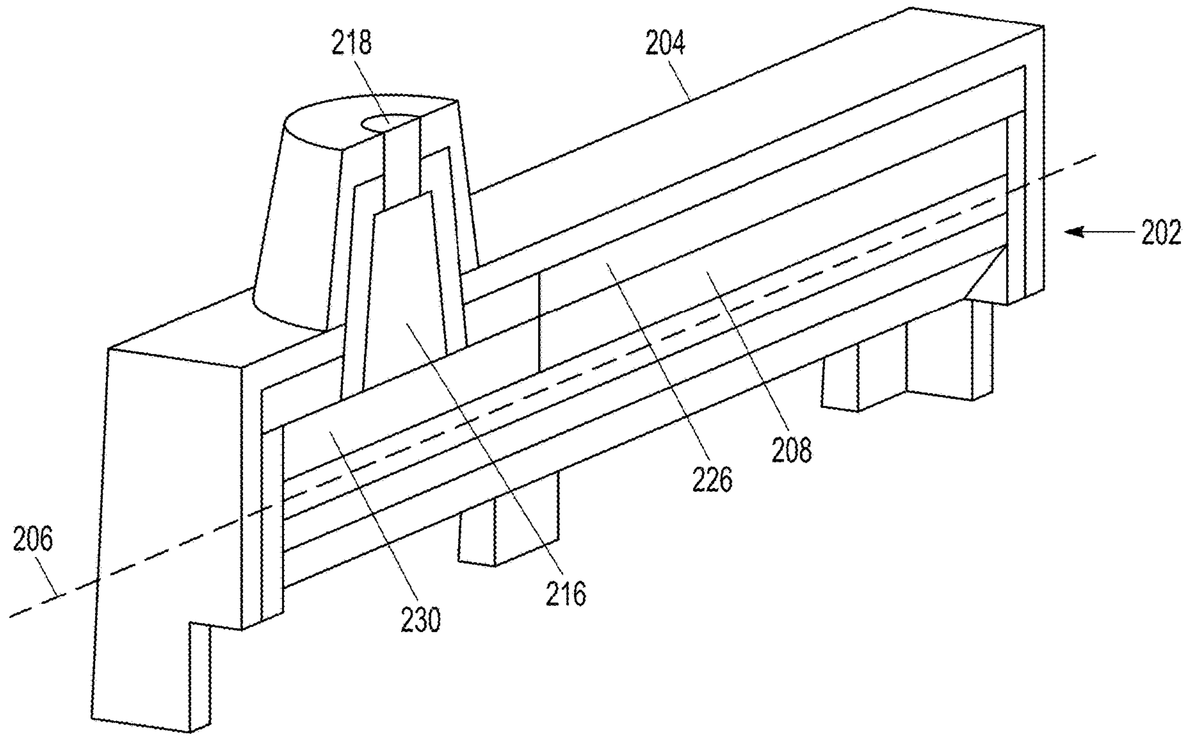

The present disclosure provides a linear shaped charge electro-explosive (LSCe) device in which an initiator and booster charge are integrated on a backside of the LSC. The initiator detonates in response to an electric stimulus to produce a shockwave that detonates and propagates through the booster charge to magnify the shockwave, which in turn detonates and propagates through the main charge to further magnify the shockwave that collapses the solid V-shaped liner and projects forward a linear shaped charge jet. A wave shaper may be embedded in the main or booster charge to shape (flatten) the spherical wave front into an approximately planar wave front when it interacts with the V-shaped liner. The energetic or non-energetic components except the initiator may be formed using additive manufacturing. The device may be formed with a linear, arc or ring-shaped form factor using additive manufacturing. Additive manufacturing produces a more uniform solid V-shaped liner and enables modifying the device dimensions to optimize device energetics output. Optimal device dimensions reduce or eliminate both defects "run up" and "run down" producing a nearly complete energetics detonation and proper formation of the linear shaped charge jet.

Referring now to FIGS. 2A-2E, an embodiment of a LSCe device 200 with backside boosted initiation includes a linear shape charge (LSC) 202 having a housing 204 oriented along an axis 206, a main charge 208 formed in the housing and compressed to form a V-shaped channel 210 whose apex 212 lies along the axis 206 and a solid V-shaped liner 214 in direct contact with the surface of the main charge. The solid V-shaped liner is typically metal but may be a ceramic, glass or even polymer material. A booster charge 216 is positioned on the backside of the main charge with a lower surface in direct and intimate contact with a portion of the main charge opposite the apex 212 of the V-shaped channel 210. An initiator 218 is operatively coupled to an upper surface of the booster charge. The initiator 218 detonates in response to an electric stimulus 220 to produce a shockwave that detonates and propagates through the booster charge 216 to magnify the shockwave, which in turn detonates and propagates through the main charge 208 to further magnify and propagate the shockwave that collapses the solid V-shaped liner 214 and projects forward a linear shaped charge jet.

The booster charge 216 and main charge 208 may use interchangeable high explosives including but not limited to C4, PBXN-5, PBXN-110, HMX, RDX, PETN, HNS. The high explosives are composed so that the booter charge has a lower detonation threshold (is more sensitive) than the main charge such that detonation of the booster charge and then main charge progressively magnify the shockwave.

A single initiator 218 and booster charge 216 are centrally located along the LSC 202 to minimize run-up and run-down. In other embodiments, multiple initiators/booster charges are spaced along the LSC.

The initiator 218 may be one of an EFI, a LEEFI, an EBW Initiator, or a hotwire initiator. The initiator may be partially or fully embedded in the booster charge 216 or adjacent the booster charge.

The housing 204 may be formed of a high-density material that provides both packaging and tamping to focus the magnified shockwave onto the V-shaped liner 214. Alternately, the housing 204 may formed of a low-density material such as a plastic or lightweight metal that is not suitable for tamping. A high-density tamping liner 222 (e.g., a ceramic or metal) is positioned in the housing 204 to surround the main and booster charges 208 and 216 to focus the shockwave onto the V-shaped liner. Tamping liner 222 may include an open rectangular box 224, a lid 226 and a generally conically shaped protrusion 228.

The housing 204 includes a generally conically shaped protrusion 228 that houses the booster charge 216 and the initiator 218. The housing may include a plurality of stand-offs 225 that provide a sufficient stand-off distance to allow the linear shaped charge jet to form. If the V-shaped channel has a depth "X" measured to the apex of the V, the minimum stand-off should be at least X to properly form the linear shaped charge jet.

Single-point initiation produces a shockwave with a spherical wave front. A wave shaper 230 (optional) is embedded in the main charge 208 between the apex 212 of the V-shaped channel 210 and the top of booster charge 216. The wave shaper 230 shapes (flattens) the spherical wave front of the magnified shockwave to approximate a planar wave front that collapses the V-shaped liner 214. The wave shaper 230 and booster charge 216 reduce or completely eliminate run-up and run-down. As shown, the wave shaper 230 may be parallel to the axis 206 and extends at least the length of an interface between the booster and main charge. Alternately, the wave shaper may be perpendicular to the axis having a length equal to the width of the main charge. Alternately, the wave shaper 230 can be positioned in the booster charge 216 opposite the apex of the V-shaped channel. The exact positioning of the wave shaper 230 is determined to optimize device performance.

Wave shaper 230 is a non-energetic material having a higher density than the surrounding energetics (the booster or main charge). Placement of wave shaper 230 parallel to or perpendicular to the axis and opposite the apex of the V-channel tends to slow the center of the magnified shockwave relative to the edges of the magnified shockwave thereby flattening the wave front that impacts the V-shaped liner.

In different embodiments, energetics (e.g., the booster charge 216 and main charge 208) and non-energetics (V-shaped layer 214, wave shaper 230, high-density tamping liner 222 and the housing 204) are created via additive manufacturing. In one case, only the main charge 208 and the wave shaper 230 embedded therein are created using additive manufacturing. In another case, only the non-energetic components are created using additive manufacturing. In yet another case, every energetic and non-energetic component except the initiator is created using additive manufacturing.

Additive manufacturing is a consistent, repeatable deposition process that greatly improves the uniformity of the V-shaped liner 214 as well as other components and enables energetic levels, greater than 60 grams/device-ft, and lengths at those energetic levels in excess of 0.4 inches, that can be achieved in both linear and circular form factors (e.g., arcs or rings). The LSCe device 200 can scale in energetics without limitation on the amount of curvature or length. Additive manufacturing enables embedding the wave 230 shaper into the main charge 208.

Figure 3:
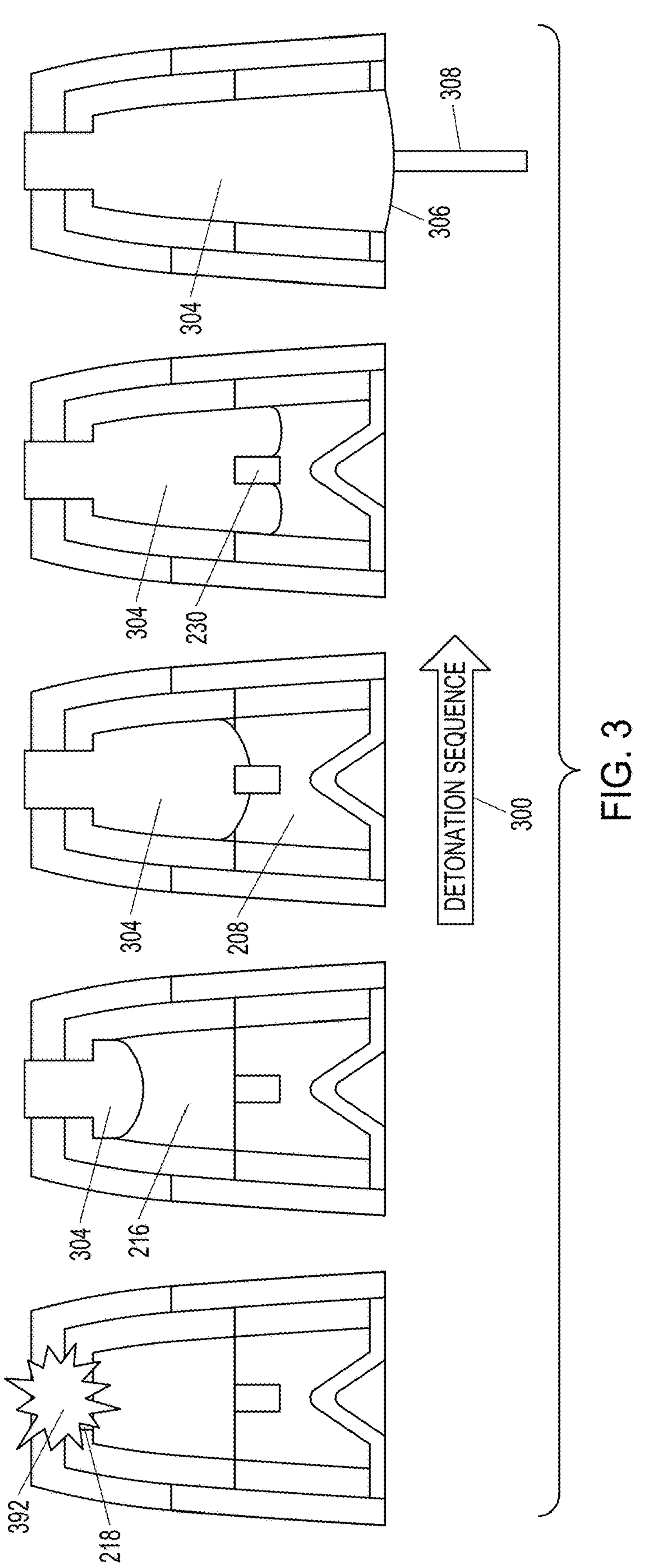
FIG. 3 illustrated different times in the detonation of the LSCe including a waveform shaper.

Referring now to FIG. 3, a detonation sequence 300 of LSCe device 200 starts with detonation 302 of the initiator 218 in response to the application of an electrical stimulus. This produces a shockwave 304 that initiates booster charge 216 detonation, which in turn magnifies the shockwave 304. The magnified shockwave 304 detonates the main charge 208, which again magnifies the shockwave 304. The magnified shockwave 304 propagates around wave shaper 230, which flattens the magnified shockwave 304 such that an approximately planar wave front 306 of the magnified shockwave collapses the V-shaped liner 214 to produce a LSC jet 308.

Figure 4:
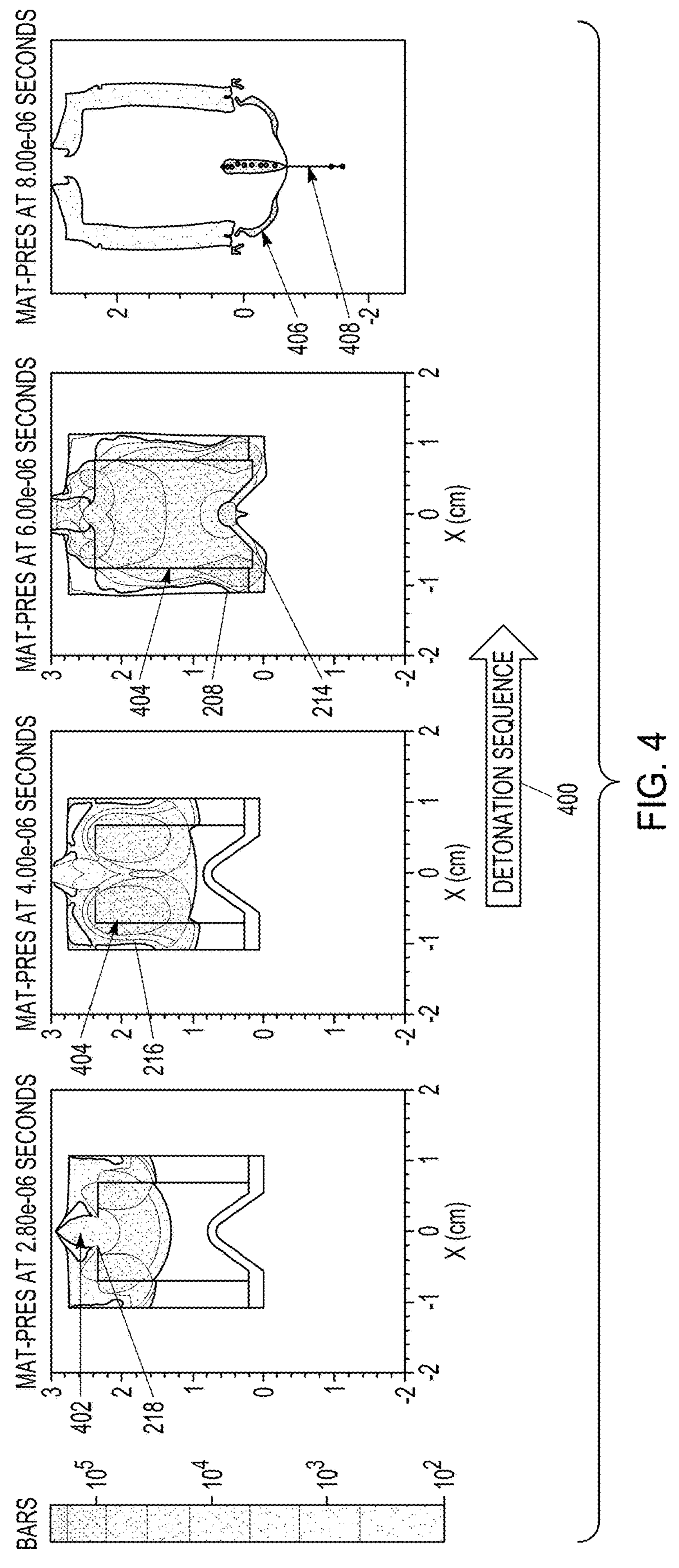
FIG. 4 illustrates different times in the detonation of the LSCe without a waveform shaper.

Referring now to FIG. 4, a detonation sequence 300 of LSCe device 200 sans wave shaper 30 starts with detonation 402 of the initiator 218 in response to the application of an electrical stimulus. This produces a shockwave 404 that initiates booster charge 216 detonation, which in turn magnifies the shockwave 304. The magnified shockwave 404 detonates the main charge 208, which again magnifies the shockwave 404. The spherical wave front 406 of magnified shockwave 304 collapses the V-shaped liner 214 to produce a LSC jet 408.

Figure 5:
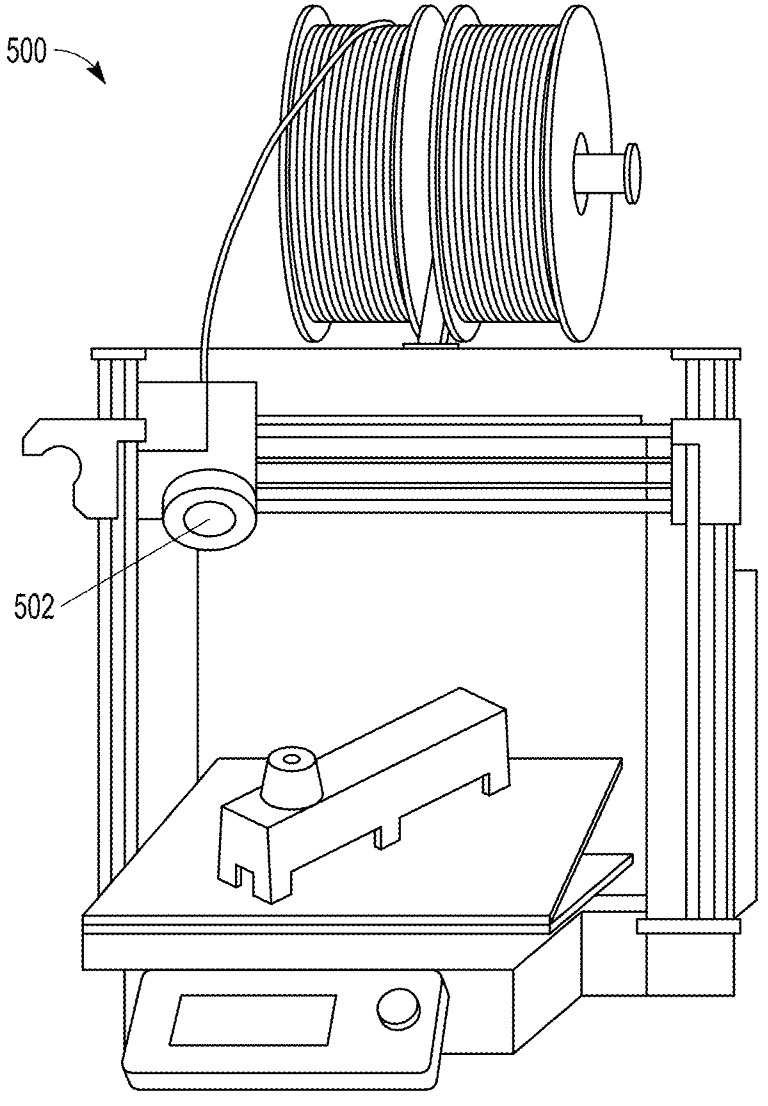
FIGS. 5 and 6 illustrate an additive manufacturing printer and fabrication of the LSCe using additive manufacturing.
Figure 6:
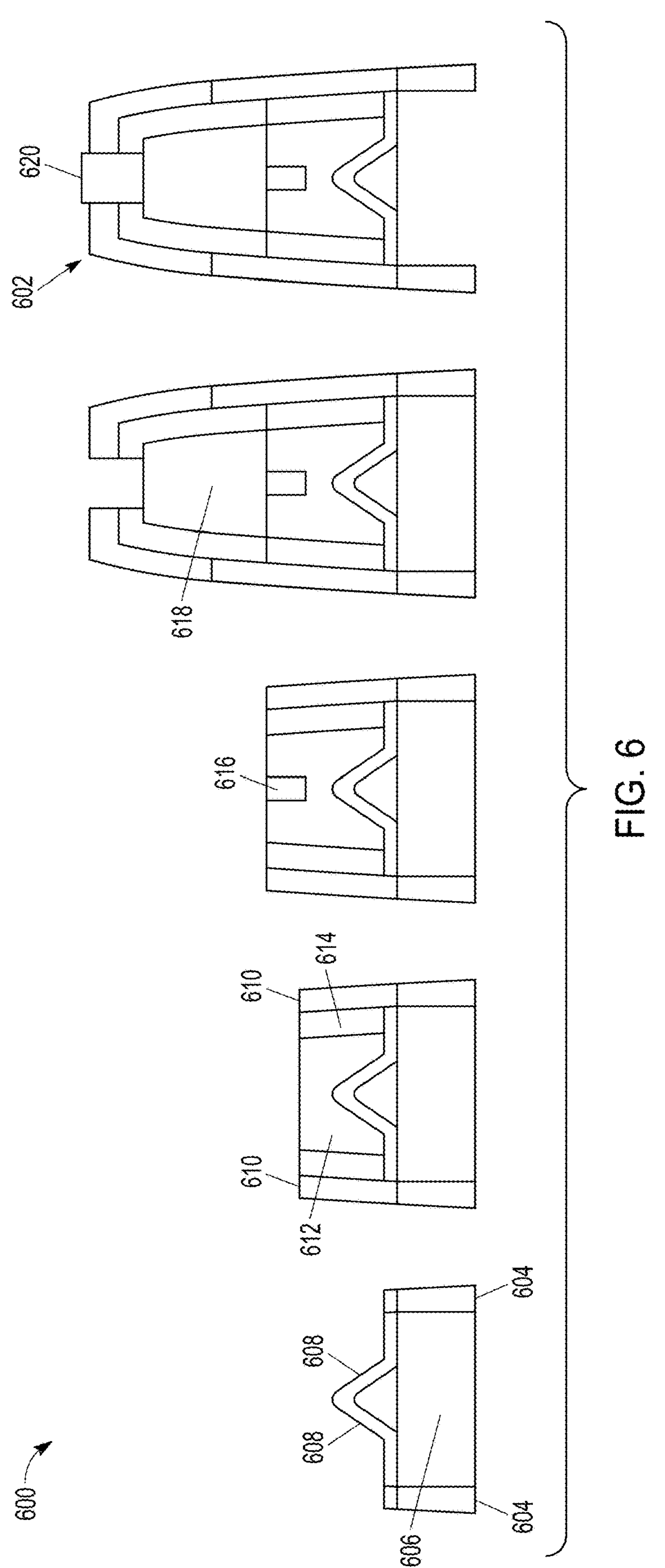

Referring now to FIGS. 5 and 6, in an embodiment a 3D additive manufacturing system 500 includes a plurality of heads 502, one each for each of the energetic materials (main charge and booster charge) and non-energetic materials (housing, tamping material, liner material and wave shaper material). "Additive manufacturing" is broadly used herein to refer to processes in which features are formed by selectively adding material (selectively solidifying a structural energetic or non-energetic powder), as opposed to removing material from an already-existing larger structure (subtractive manufacturing). Such a process is often referred to generally as three-dimensional (3D) printing.

An exemplary additive manufacturing sequence 600 fabricates all energetic and non-energetic components except the initiator to form LSCe device 602. The process starts by using different heads 502 to form device stand-offs 604 around a temporary support structure 606 having a V-shaped protrusion along an axis. Different heads 502 are then used to add different materials to form a V-shaped liner 608, a housing 610, a main charge 612 and tamping liner 614.

Different heads 502 are then used to embed a wave shaper 616 in main charge 612. Head 502 are then used to build a booster charge 618 and to extend tamping liner 614 and housing 608. Once complete the temporary support structure 606 is removed an initiator 620 is inserted to form LSCe device 602.

Figure 7A:
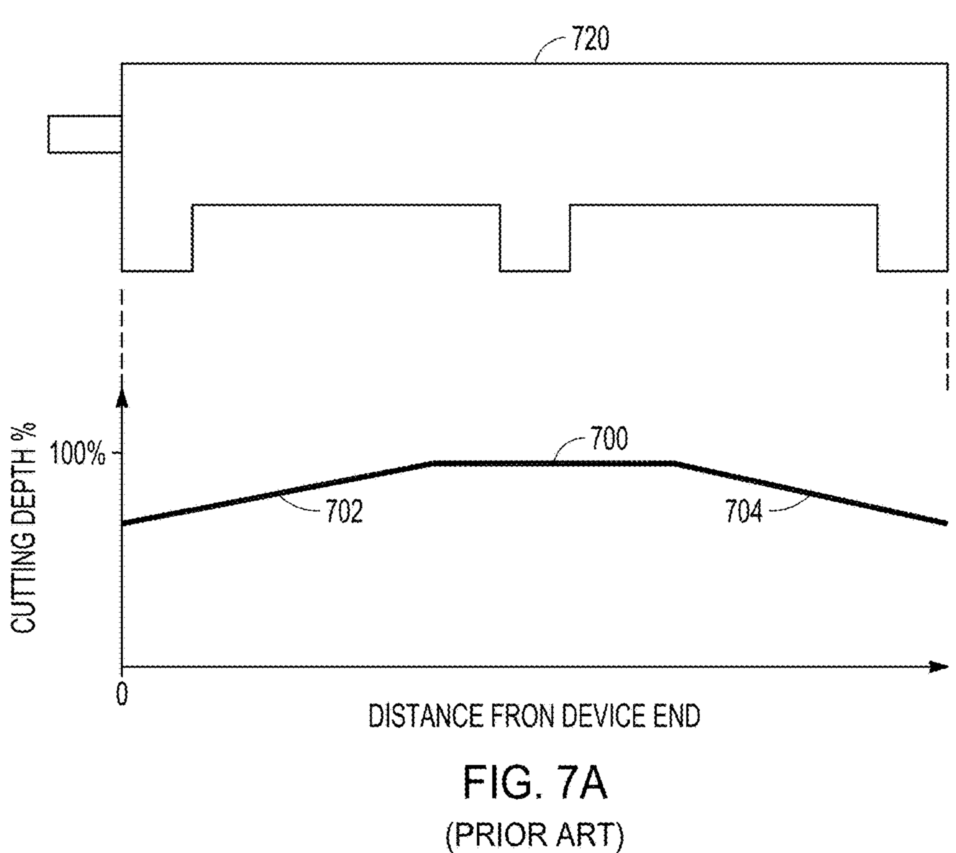
FIGS. 7A-7B illustrate a comparison of run up between a LSC without and with an integrated booster charge and wave shaper.
Figure 7B:
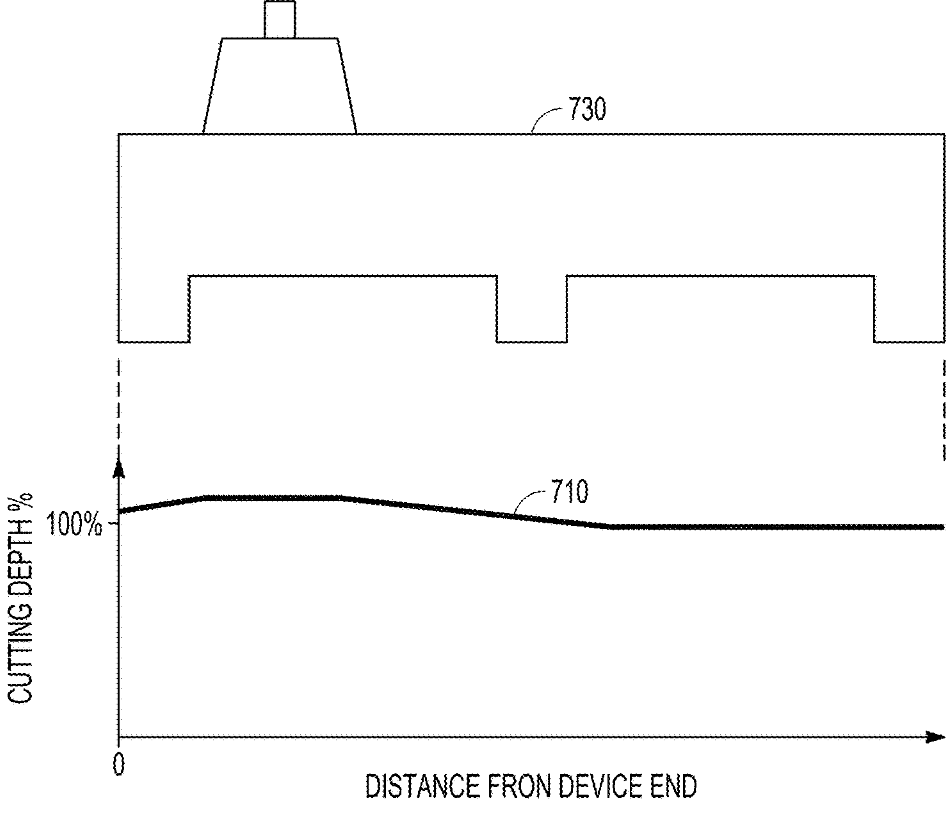

Referring now to FIGS. 7A and 7B, plots 700 and 710 of the main charge cutting depth percentage versus distance from the end of the device compare run-up and run-down of a conventional end-initiated LSC 720 a backside-initiated, boosted and wave shaped LSCe device 730. As shown plot 700 exhibits a certain length of run-up 702 and 704, which degrades the cutting performance of the device. As shown in plot 710, the backside boosted and initiated LSCe device eliminates both run-up and run-down or localized loss of shockwave velocity reducing in inefficient output. LSCe eliminates both defects through the boosted and magnified shockwave velocity being high enough to assure complete detonation of the main charge at the device ends. The booster charge accelerates the limited detonator sourced shockwave by adding energy as the energetic detonates. The wave shaper optimizes the shockwave forming a flatter wave front which is optimal for the liner collapse through shock-wave focusing. In conventional LSC end ignition, run-up or the shockwave reaching full velocity away from the deto-nator is approximately 2-3 inches. Run-down behavior is the opposite of run up as the shockwave velocity decreases. In the conventional end-initiated LSC design, the cutting power decreases proportional with shockwave velocity approximately 2-3 inches near the end of the LSC away from the ignition end. The full detonation is not sustained through the distant end.

Figure 8B:
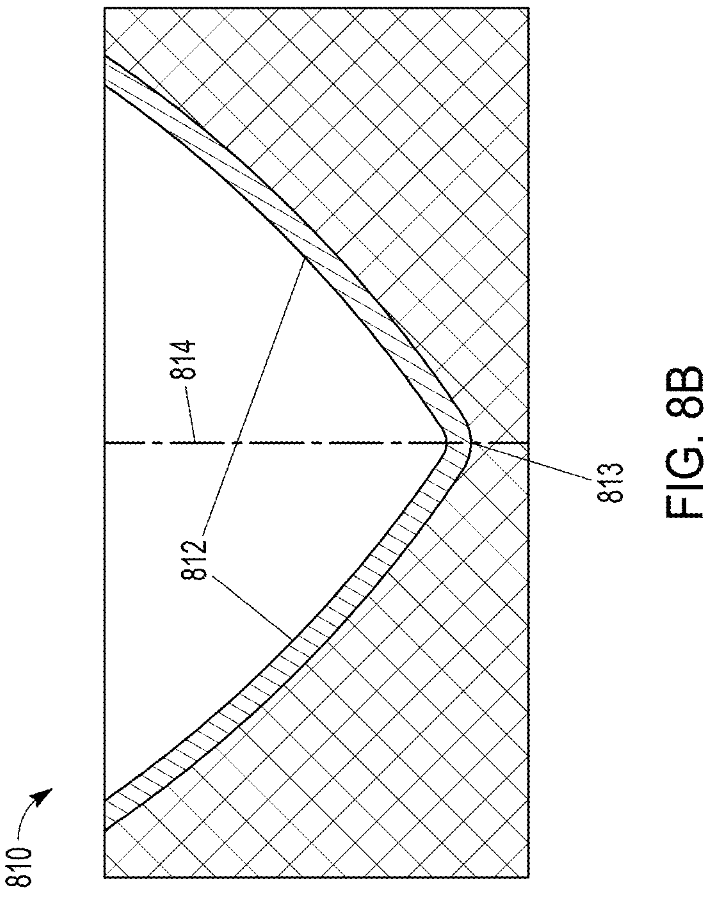
FIGS. 8A-8B illustrate alternate trumpet and K-shaped liners for the LSCe.
Figure 8A:
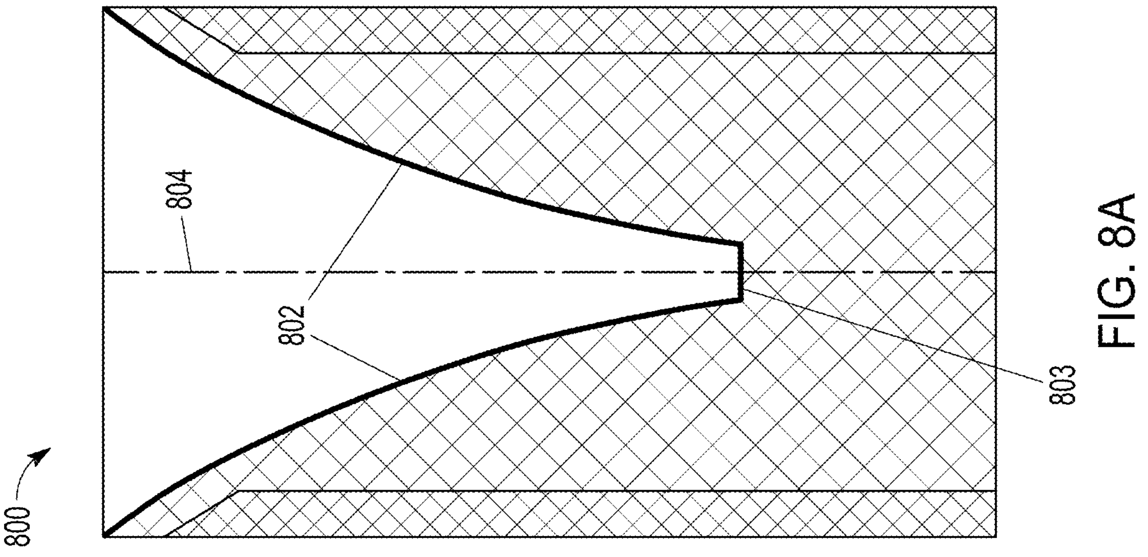

As shown in FIGS. 2A-2D, the V-shaped channel 210 (and V-shaped liner 214) have opposing surfaces joined at the apex 212 with an apex angle of 40-120°. The V-shaped channel and V-shaped liner may be one of a V-shape in which the opposing surfaces are flat as shown throughout the representative embodiment or, as shown in FIGS. 8A-8B have a trumpet shape 800 in which the opposing surfaces 802 extend forward from an apex 803 and curve outward from an axis 804 or a K-shape 810 in which the opposing surfaces 812 extend forward from an apex 813 and curve inward towards an axis 814.

Figure 9B:
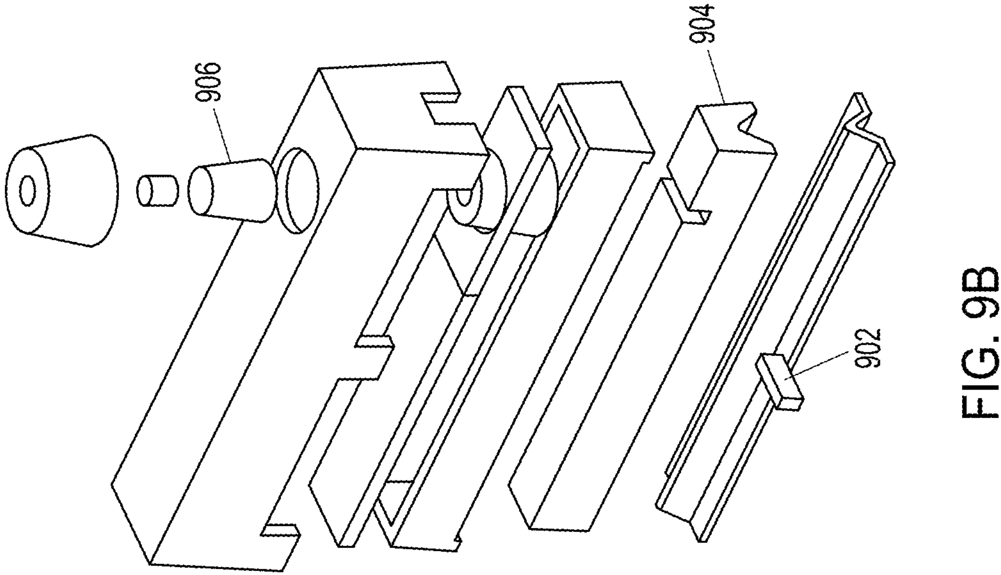
FIGS. 9A-9B illustrate an alternative embodiment of the wave shaper in which the wave shaper is perpendicular to the axis.
Figure 9A:
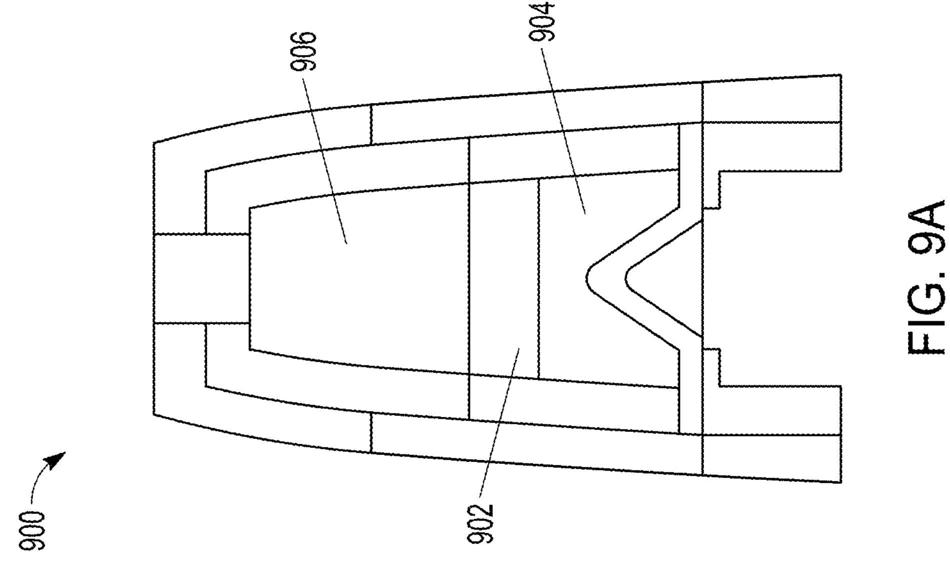

Referring now to FIG. 9, in an embodiment of a LSCe device 900, a wave shaper 902 is embedded in a main charge 904 and formed perpendicular to a long axis 906 of the device. The wave shaper spans the width of a booster charge 908.

Figure 10B:
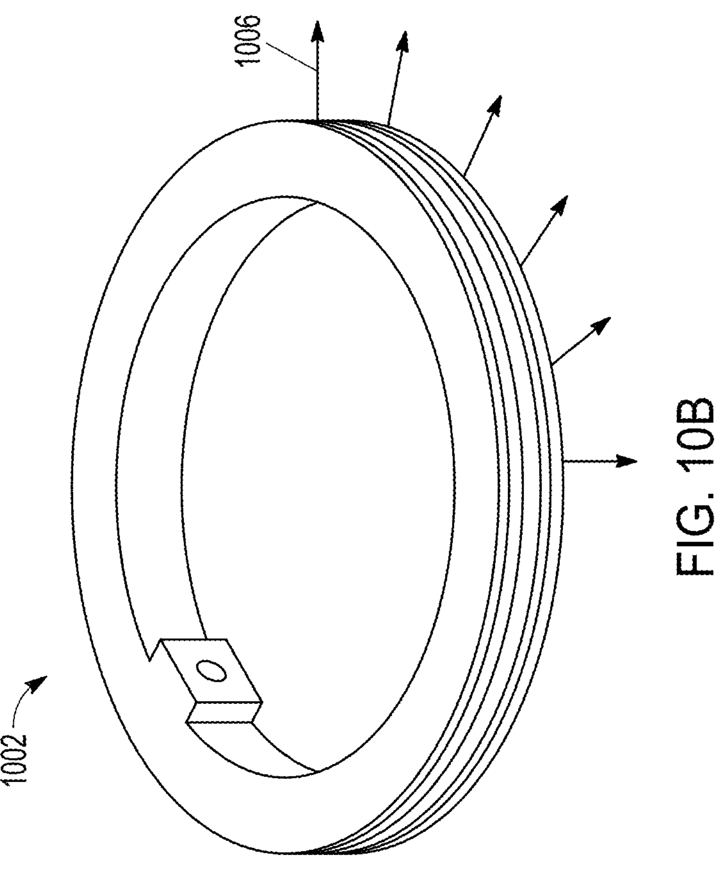
FIGS. 10A-10B illustrate arc and ring-shaped embodiments of an LSCe.
Figure 10A:
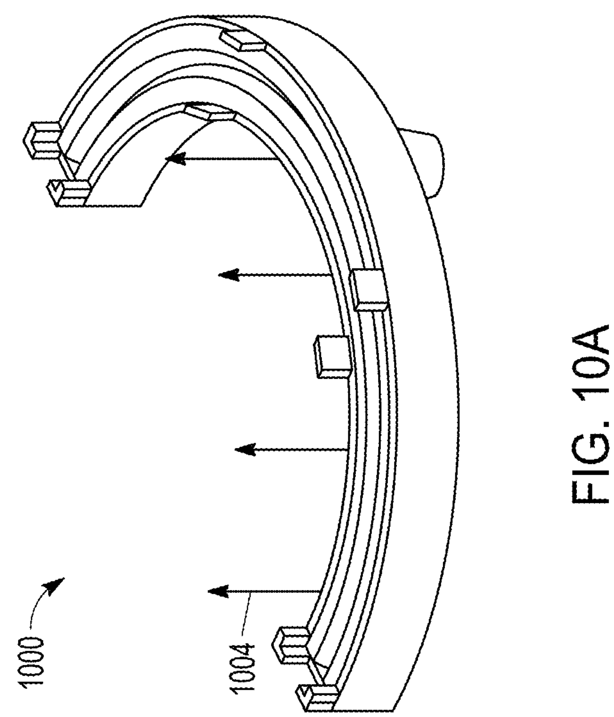

Referring now to FIGS. 10A-10B, the LSCe devices 1000 and 1002 can be formed into an arc or a ring-shape, respectively. As shown LSCe device 1000 is configured in an approximate radial shape to form and project a LSC jet 1004 perpendicular to the plane of the arc. As shown, LSCe device 1002 is configured to form and project a LSC jet 1006 outward from the center of the ring. In either an arc or a ring, additive manufacturing provides significant advantages over traditional manufacturing. The arc or ring may be larger in size and have a stronger energetic component (grams/de-vice-ft) without cracking or breaking.

Figures 11A, 11B, 11C:
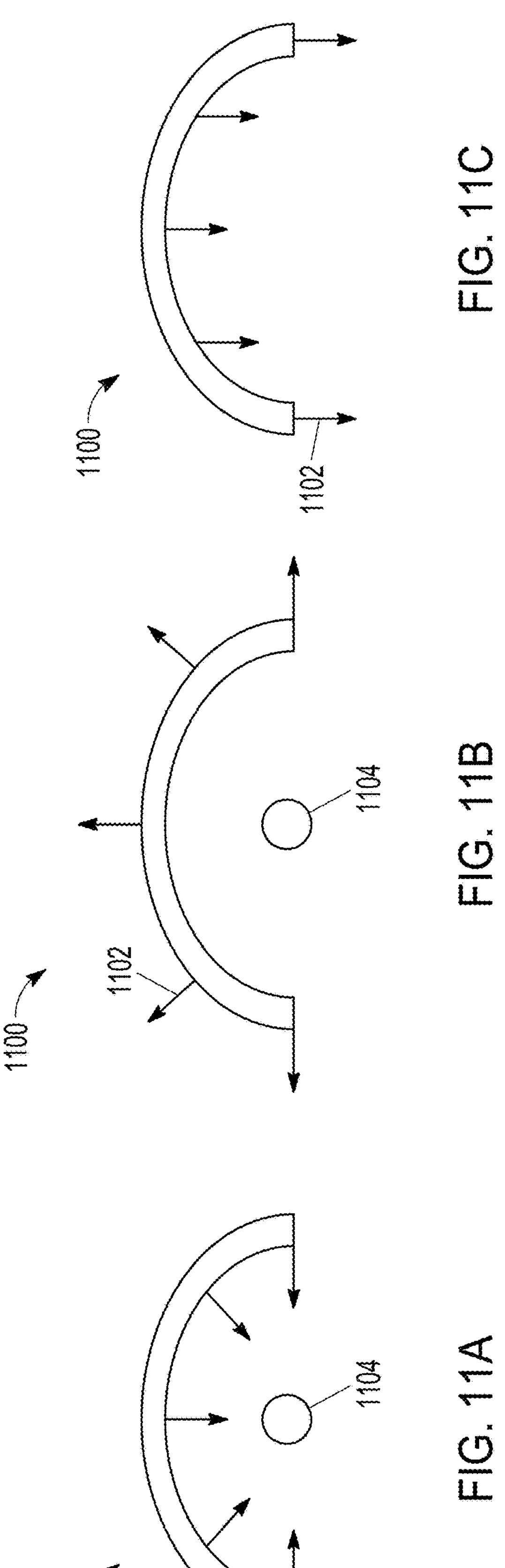
FIGS. 11A-11C are different configurations of an arc LSCe to fire the shaped-charge jet perpendicular to the plane of the arc, inward toward the center of the arc, and outward away from the center of the arc.

Referring now to FIGS. 11A-11C, an approximate arc-shaped LSCe device 1100 may be configured to projects a linear shape charge jet 1002 either perpendicular to the plane of the arc, inward toward a center 1004 of the arc or outward away from the center 1004 of the arc. The same is true for a ring-shaped LSCe device.

Figure 12A:
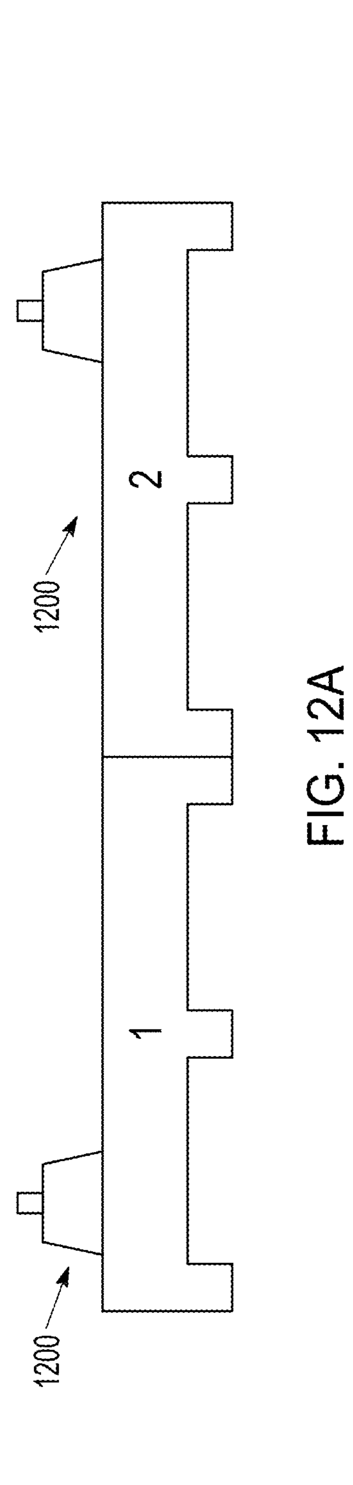
FIGS. 12A-12B illustrate module configurations of the LSCe with independent initiators and single-point initiation
Figure 12B:
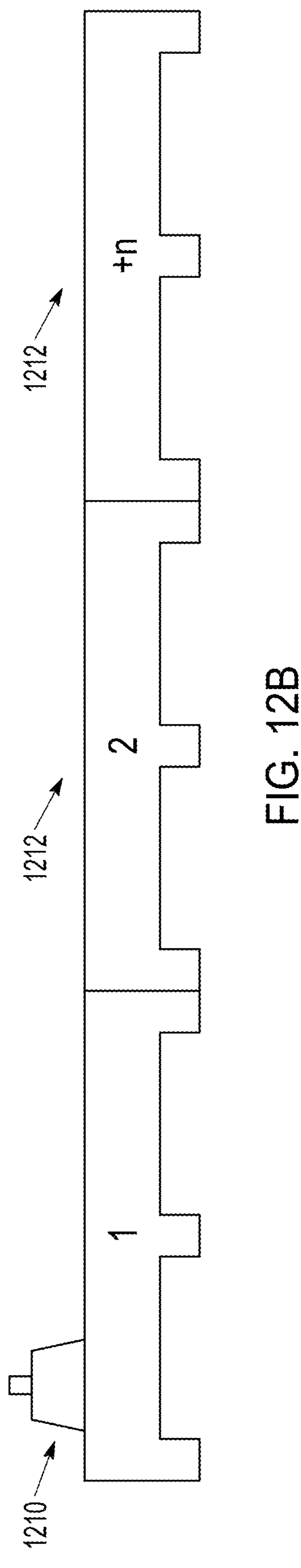

Referring now to FIGS. 12A-12B, N LSCe devices, where N is an integer of two or more, may be arranged end-to-end or tip-to-tail to extend the linear shaped charge jet. In one configuration, each LSCe device 1200 includes the booster and initiator and is independently initiated. In another configuration, one or more LSCe devices 1210 include the booster and initiator and are operatively coupled to initiate other LSC devices 1212. In this configuration, the far end of LSCe device is left open, and both ends of the LSC devices (except the last one) are left open to operatively couple the magnified shock wave to propagate through and detonate the LSC devices.

While several illustrative embodiments of the disclosure have been shown and described, numerous variations and alternate embodiments will occur to those skilled in the art. Such variations and alternate embodiments are contem-plated and can be made without departing from the spirit and scope of the disclosure as defined in the appended claims.

We claim:

1. A linear shaped charge electro-explosive (LSCe) device, comprising:

a non-fluted linear shape charge (LSC) including a hous-ing oriented along an axis, a main charge formed in the housing and compressed to form a single, contiguous V-shaped channel whose apex lies along the axis and a single solid V-shaped liner in direct contact with the surface of the main charge, a tapered booster charge having a lower surface in direct and intimate contact with a portion of the main charge opposite the apex of the V-shaped channel and an upper surface, said lower surface being broader than said upper surface, an initiator in direct contact with the upper surface of the booster charge, wherein the initiator detonates in response to an electric stimulus to produce a shockwave that propagates through and detonates the booster charge magnifying the shockwave opposite the apex axis of the V-shaped channel, which in turn propagates through and deto-nates the main charge further magnifying the shock-wave that collapses the single solid V-shaped liner and projects forward a single shaped charge jet.

2. The LSCe of claim 1, wherein the entire LSCe device except for the initiator including the housing, the solid V-shaped liner, the main charge and booster charge are integrally created via additive manufacturing.

3. The LSCe of claim 1, wherein the axis is a straight line, wherein the LSC projects the linear shaped charge jet downward perpendicular to the axis.

4. The LSCe of claim 1, wherein the axis forms an arc, wherein the LSC projects the linear shape charge jet either perpendicular to the arc, inward toward a center of the arc or outward away from the center of the arc.

5. The LSCe of claim 1, wherein the shockwave has a wave front, further comprising:

a wave shaper embedded in the booster charge or main charge opposite the apex of the V-shaped channel, wherein said wave shaper flattens the wave front to collapse the solid V-shaped liner.

6. The LSCe of claim 5, wherein upon detonation the wave front is approximately spherical, wherein the wave shaper flattens the spherical wave front as the magnified shockwave propagates through the main charge to approxi-mate a planar wave front.

7. The LSCe of claim 5, wherein the wave shaper is parallel to the axis and spans the length of the booster charge along the axis.

8. The LSCe of claim 5, wherein the wave shaper is perpendicular to the axis and spans the width of the booster charge perpendicular to the axis.

9. The LSCe of claim 5, wherein at least the wave shaper and the booster or main charge in which the wave shaper is embedded are created via additive manufacturing.

10. The LSCe of claim 5, wherein the housing, main charge, V-shaped liner, booster charge and the wave shaper are created via additive manufacturing.

11. The LSCe of claim 1, further comprising:

a high-density tamping liner that surrounds the main charge and booster charge to focus the shockwave onto the solid V-shaped liner.

12. The LSCe of claim 1, further comprising:

a plurality of stand-offs on the housing that provide a sufficient stand-off distance to allow the linear shaped charge jet to form.

13. A linear shaped charge electro-explosive (LSCe) device, comprising:

a non-fluted linear shape charge (LSC) including a housing oriented along an axis, a main charge formed in the housing and compressed to form a single, contiguous V-shaped channel whose apex lies along the axis and a single solid V-shaped liner in direct contact with the surface of the main charge, a booster charge having a lower surface in direct and intimate contact with a portion of the main charge opposite the apex of the V-shaped channel and within the housing, a wave shaper embedded in the booster charge or main charge opposite the apex of the V-shaped channel, an initiator in direct contact with an upper surface of the booster charge within the housing, wherein the initiator detonates in response to an electric stimulus to produce a shockwave with a wave front that detonates and propagates through the booster charge to magnify the shockwave, which in turn detonates and propagates through the main charge to further magnify the shockwave, wherein said wave shaper flattens the wave front of the magnified shockwave as it propagates through the main charge to collapse the solid V-shaped liner and projects forward a shaped charge jet.

14. The LSCe of claim 13, wherein the wave shaper is parallel to the axis and spans the length of the booster charge along the axis.

15. The LSCe of claim 13, wherein the wave shaper is perpendicular to the axis and spans the width of the booster charge perpendicular to the axis.

16. The LSCe of claim 13, wherein at least the wave shaper and the booster or main charge in which the wave shaper is embedded are created via additive manufacturing.

17. The LSCe of claim 13, wherein only non-energetic components including the housing, the V-shaped liner and the wave shaper are created via additive manufacturing.

18. A linear shaped charge electro-explosive (LSCe) device, comprising:

a non-fluted linear shape charge (LSC) including a housing oriented along an axis, a main charge formed in the housing and compressed to form a V-shaped channel whose apex lies along the axis and a solid V-shaped liner in direct contact with the surface of the main charge, a booster charge having a lower surface in direct and intimate contact with a portion of the main charge opposite the apex of the V-shaped channel and within the housing, an initiator in direct contact with an upper surface of the booster charge within the housing, wherein at least the entire LSCe device except the initiator include the housing, the solid V-shaped liner, the main charge, and booster charge are integrally created via additive manufacturing, wherein the initiator detonates in response to an electric stimulus to produce a shockwave that detonates and propagates through the booster charge magnifying the shockwave, which in turn detonates and propagates through the main charge to further magnify the shockwave that collapses the solid V-shaped liner and projects forward a shaped charge jet.

19. The LSCe of claim 18, wherein the shockwave has a wave front, further comprising:

a wave shaper embedded in the booster charge or main charge opposite the apex of the V-shaped channel, wherein said wave shaper flattens the wave front of the magnified shockwave as it propagates through the main charge to approximate a planar wave front that collapses the solid V-shaped liner, wherein the wave shaper is created via additive manufacturing.

* * * * *